US006678378B1

(12) United States Patent
Akiyoshi (10) Patent No.: US 6,678,378 B1
(45) Date of Patent: Jan. 13, 2004

(54) 3-DIMENSIONAL SHAPE DATA ENCRYPTION AND DECRYPTION

(75) Inventor: Kozo Akiyoshi, Tokyo (JP)

(73) Assignee: Monolith Co., Ltd., Tokyo (JP)

( * ) Notice: Subject to any disclaimer, the term of this patent is extended or adjusted under 35 U.S.C. 154(b) by 0 days.

(21) Appl. No.: 09/327,458

(22) Filed: Jun. 8, 1999

(30) Foreign Application Priority Data

Jun. 9, 1998 (JP) ........................................ H10-160603

(51) Int. Cl.[7] .................................................. H04L 9/00
(52) U.S. Cl. ............................ 380/54; 380/59; 380/28; 380/243; 380/202; 380/210
(58) Field of Search .............................. 380/28, 54, 243, 380/202, 210, 58, 59; 713/176

(56) References Cited

U.S. PATENT DOCUMENTS 4,799,103 A * 1/1989 Muckerheide ............... 348/42
5,374,976 A * 12/1994 Spannenburg ............... 283/72

OTHER PUBLICATIONS

Ryutarou Ohbuchi, "Watermarking Three-Dimentional Polygonal Models Though Geometric and Topological Modifications", May 1998, IEEE journal, Vol 16.*

* cited by examiner

Primary Examiner—Gilberto Barrón
Assistant Examiner—Grigory Gurshman
(74) Attorney, Agent, or Firm—Fleshner & Kim, LLP (57) ABSTRACT

Encryption and decryption methods for 3-dimensional shape data, especially copyrighted data, useful for detecting unauthorized use or piracy of a 3-dimensional object's shape represented by the 3-dimensional shape data are provided. An alteration is added to 3-dimensional shape data representing a 3-dimensional object by using an encryption key. The encrypted data, having been altered, are distributed. The 3-dimensional object represented by the encrypted data is distorted and different from the original 3-dimensional object. The recipient of the encrypted data can obtain the original 3-dimensional shape data by reversing the alteration of the encrypted data by using a decryption key.

20 Claims, 12 Drawing Sheets

|  |  | (COORDINATE VALUES)/THE KIND |
|---|---|---|
| NODES | N1 | (X1,Y1,Z1) /2 |
|  | N2 | (X2,Y2,Z2) /2 |
|  | N3 | (X3,Y3,Z3) /1 |
|  | N4 | (X4,Y4,Z4) /1 |
|  | N5 | (X5,Y5,Z5) /0 |
|  | N6 | (X6,Y6,Z6) /0 |

*FIG.5*

|  |  | (CONNECTED NODES)/EQUATION |
|---|---|---|
| EDGES | E1 | (N1,N3) /Eeq1 |
|  | E2 | (N2,N3) /Eeq2 |
|  | E3 | (N3,N4) /Eeq3 |
|  | E4 | (N4,N5) /Eeq4 |
|  | E5 | (N4,N6) /Eeq5 |

*FIG.6*

| CONTOURS | | EDGE/EQUATION/Z VALUE |
|---|---|---|
| | C1 | E1 / Ceq1 / h1 |
| | C2 | E1 / Ceq2 / h2 |
| | C3 | E1 / Ceq3 / h3 |
| | C4 | N2 / Ceq4 |
| | ⋮ | ⋮ |
| | C8 | E5 / Ceq8 / h8 |
| | C9 | N6 / Ceq9 |

| 3-DIMENSIONAL SHAPE DATA | |
|---|---|
| NODES | N10 |
| | N11 |
| EDGES | E10 |
| CONTOURS | C10 |
| | C11 |
| | C12 |

*FIG.8B*

| ENCRYPTION KEY |
|---|
| N → N |
| E → E |
| C $\xrightarrow{R}$ CP |

| ENCRYPTED DATA | |
|---|---|
| NODES | N10 |
| | N11 |
| EDGES | E10 |
| CONTOURS | C10 |
| | C11 |
| | C12P |

| ENCRYPTED DATA | |
|---|---|
| NODES | N10 |
| | N11 |
| EDGES | E10 |
| CONTOURS | C10 |
| | C11 |
| | C12P |

FIG.9B

CLIENT12a

| DECRYPTION KEY Ka |
|---|
| N → N |
| E → E |
| Cp $\xrightarrow{Ra^{-1}}$ Ca |

| ENCRYPTED DATA | |
|---|---|
| NODES | N10 |
| | N11 |
| EDGES | E10 |
| CONTOURS | C10 |
| | C11 |
| | C12P |

*FIG. 10B*

CLIENT12a

| DECRYPTION KEY Ka |
|---|
| N → N |
| E → E |
| $Cp \xrightarrow{Ra^{-1}} Ca$ |

3-DIMENSIONAL SHAPE DATA ENCRYPTION AND DECRYPTION

This patent application claims priority based on a Japanese patent application, H10-160603 filed on Jun. 9, 1998, the contents of which are incorporated herein by reference.

BACKGROUND OF THE INVENTION

1. Field of the Invention

The present invention relates to encryption and decryption for 3-dimensional shape data, especially copyrighted data, representing a shape of a 3-dimensional object.

2. Description of the Related Art

The term "restoration" in this specification means an operation whereby data having been altered are restored closely to the original data. "Restoration" includes the case where restored data are not completely identical to the original data.

In the field of CAD (Computer Aided Design) and CG (Computer Graphics), 3-dimensional objects are drawn on 2-dimensional display screens using various methods. In CAD and CG, 3-dimensional shape data representing a shape of a 3-dimensional object are used. 3-dimensional shape data will become more and more important in a networked society where providers will distribute 3-dimensional shape data as digital content. 3-dimensional shape data will be needed for virtual digital 3D museums, 3D catalogs for cyber shopping and so on.

Transfer of 3-dimensional shape data can be carried out easily from one person to another via a portable recording medium such as an FD (Floppy Disc) or a CD (Compact Disc), or via a network such as the Internet.

Once 3-dimensional shape data have been transferred from a creator of the data, it is difficult to restrict how the data are used thereafter. In other words, a user who has received the 3-dimensional shape data can freely reproduce the 3-dimensional shape data without any permission of the original creator or copyright holder. In reality, even identifying such unauthorized use has been difficult.

SUMMARY OF THE INVENTION

An object of the present invention is therefore to provide 3-dimensional shape data encryption and decryption methods useful for preventing unauthorized use of a 3-dimensional object's shape represented by 3-dimensional shape data. Another object of the present invention is to provide 3-dimensional shape data encryption and decryption methods which enable identification of a user of 3-dimensional shape data.

According to a first aspect of the present invention, a 3-dimensional shape data encryption method comprising acquiring 3-dimensional shape data representing a shape of a 3-dimensional object, and generating encrypted data of the 3-dimensional object by altering the 3-dimensional shape data is provided.

The 3-dimensional object represented by the encrypted data differs from the 3-dimensional object represented by the 3-dimensional shape data before the alteration. Consequently, unless the encrypted data are restored as the original 3-dimensional shape data, the original 3-dimensional object will not be meaningfully displayed on a screen or the like. Therefore, management of a decryption key to restore the encrypted data leads to management of use permission/prohibition regarding the 3-dimensional shape data.

According to another aspect of the present invention, a 3-dimensional shape data decryption method comprising acquiring encrypted data of a 3-dimensional object, the encrypted data being generated by applying alteration to 3-dimensional shape data representing a shape of the 3-dimensional object, and generating decrypted data whereto an identifier has been added is provided.

Upon restoration of the encrypted data of a 3-dimensional object, decrypted data whereto an identifier has been added by altering the 3-dimensional shape data may be generated. This decryption method for 3-dimensional shape data is useful for adding an identifier (ID) to 3-dimensional shape data.

The identifier may be added to the decrypted data by maintaining at least a portion of the alteration included in the encrypted data. Alternatively, the identifier may be added to the decrypted data by a new alteration having no relation with the 3-dimensional shape data having been decrypted completely, or by an alteration thereto completely different from the alteration included in the encrypted data.

Thus, by distributing different copies to different users and recording the relation between the users and the copies it is possible to include the steps of detecting an illegal copy of the encrypted data and identifying a user for which a copy distributed to said user is the same as or close to the illegal copy.

In any case, by adding an alteration different for each decrypted data, the source of piracy can be identified by extracting the alteration related to ID. Especially, if an identifier is added by such alteration upon decryption, the shape distributor only has to generate a single common encrypted data.

It may be preferable for at least the alteration as an identifier to be imperceptible to humans when the 3-dimensional object is displayed on a display screen based on the decrypted data. This is because an identifier can be inserted without affecting display (image) quality of a 3-dimensional object.

Furthermore, upon decryption of the encrypted data of a 3-dimensional object generated by altering the 3-dimensional shape data, a restoration degree of the encrypted data may be specified so that the 3-dimensional shape data may be decrypted based on the specified restoration degree. If the restoration degree and the display quality of the decrypted 3-dimensional shape data are related to each other, an international variance in display quality of 3-dimensional object represented by the 3-dimensional shape data decrypted in accordance with the restoration degree may be generated.

According to a second aspect of the present invention, a 3-dimensional shape data encryption method comprising acquiring 3-dimensional shape data representing a shape of a 3-dimensional object, and generating encrypted data of the 3-dimensional object whereto an identifier has been added by altering the 3-dimensional shape data differently for each destination of the 3-dimensional shape data is provided.

In the above-described 3-dimensional shape data encryption and decryption methods, the 3-dimensional shape data may include topological data which may be specified by a structure graph of the 3-dimensional object. The structure graph may be generated based on a Reeb graph. The Reeb graph may be combined with Morse theory as known in the field of differential topology. According to Morse theory, a homotopy type space of a 3-dimensional object, that is, a structure of the 3-dimensional object can be reproduced by specifying singular points of a Morse function defined on a surface of the 3-dimensional object, and the kind (index) and order thereof. What is reproduced by Morse theory is merely a homotopy space. Therefore, by using a Reeb graph, the structure of the 3-dimensional object can be represented with more clarity. A Reeb graph is a structure graph or a skeleton graph as known in the field of topology.

The 3-dimensional shape data may include geometric data specifying the 3-dimensional coordinate values of the structure graph. Such geometric data may include coordinate values of each singular point included in the Reeb graph, an equation representing a curve connecting the singular points, and an equation representing a contour of a cross section of the 3-dimensional object. Only topological information is included in a Reeb graph, therefore, if geometric information is added to a Reeb graph, the shape of a 3-dimensional object can be specified more accurately.

DESCRIPTION OF THE PREFERRED EMBODIMENT

The invention will now be described based on the preferred embodiments, which do not intend to limit the scope of the present invention, but exemplify the invention. All of the features and the combinations thereof described in the embodiment are not necessarily essential to the invention.

Figure 1:
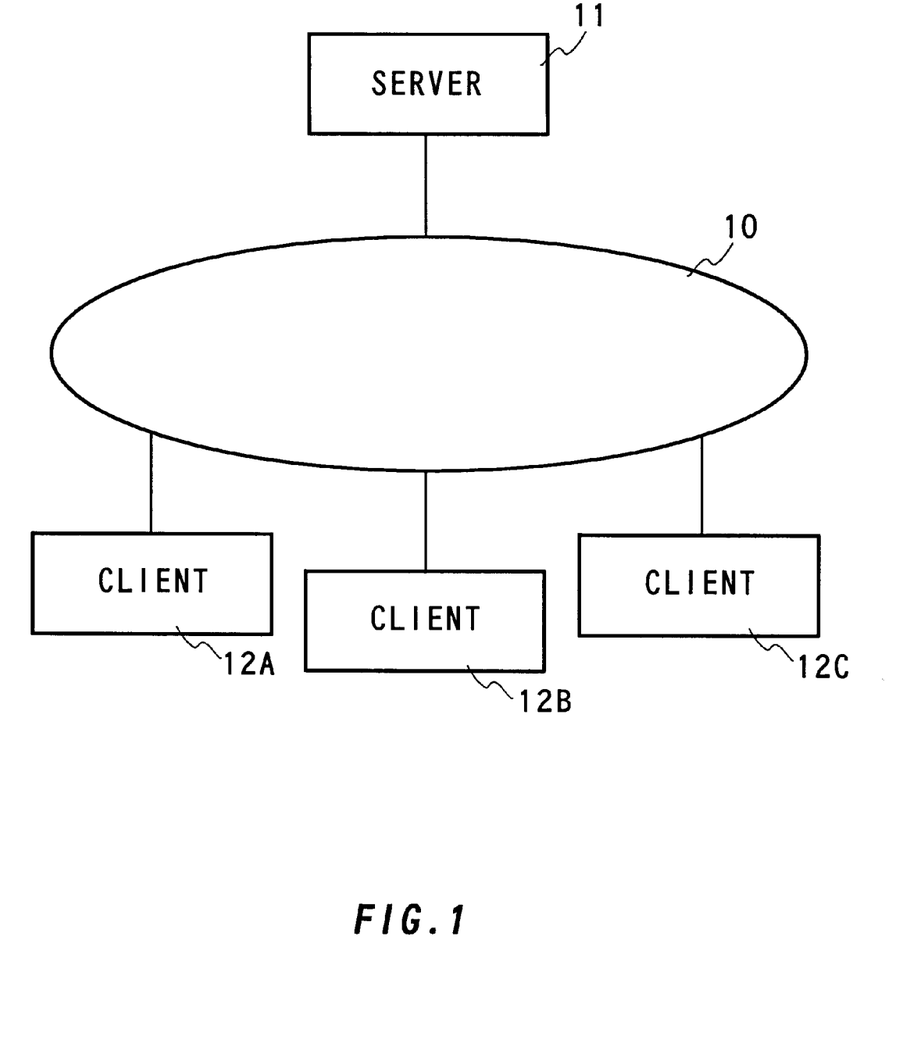
FIG. 1 is a diagram showing a schematic configuration of a computer network.

FIG. 1 shows an example of a computer network. A server 11 and a plurality of clients 12a~12c are connected to a network 10. The network 10 may be a local area network (LAN) or the Internet, for example. The server 11 and the clients 12a~12c may be, for example, personal computers, workstations, network computers, or other computer terminals.

Figure 2:
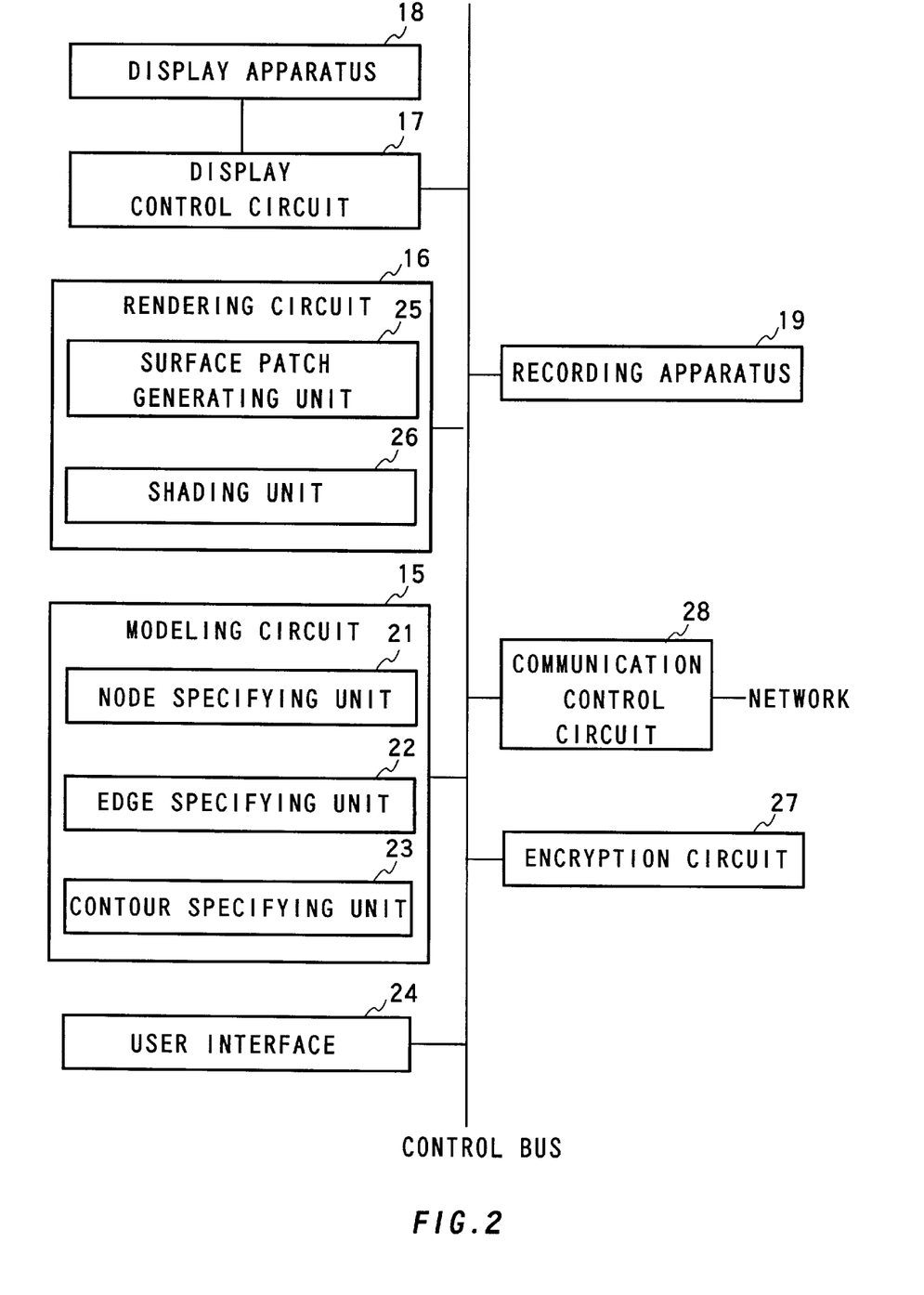
FIG. 2 is a block diagram showing a schematic configuration of a server.

As shown in FIG. 2, the server 11 comprises a modeling circuit 15 for generating 3-dimensional shape data representing a shape of a 3-dimensional object, and a rendering circuit 16 for generating 2-dimensional display data of the 3-dimensional object based on the generated 3-dimensional shape data. The generated 2-dimensional display data are input to a display control circuit 17. An image represented by the 2-dimensional display data is displayed on a 2-dimensional display screen of a display apparatus 18 by the display control circuit 17. In the case where the generated 3-dimensional shape data are stored in a recording apparatus 19, the rendering circuit 16 may also receive the 3-dimensional shape data from the recording apparatus 19.

The modeling circuit 15 comprises a node specifying unit 21 for specifying the kind and coordinate values of each singular point (node) of the 3-dimensional object as defined by a Morse function, an edge specifying unit 22 for specifying an equation representing a curve (edge) connecting the singular points, and a contour specifying unit 23 for specifying an equation representing a contour of a cross section of the 3-dimensional object. The Morse function herein referred to means a function described by Morse theory as known in the field of differential topology. The equation representing an edge or a contour and the coordinate values of a node may be specified according to a 3-dimensional xyz coordinate system pre-set for the 3-dimensional object. An operator may specify the equations and the xyz coordinate values through a user interface 24 including a keyboard and a mouse. The kind of a node may be identified automatically based on connections between edges and each node.

The modeling circuit 15 generates a Reeb graph of a 3-dimensional object based on the kind of each node and the connection between nodes specified by an edge. The Reeb graph herein referred to means a structure graph or a skeleton graph as known in differential topology. The generated Reeb graph represents topological data to be included in the 3-dimensional shape data. Based on xyz coordinate values of the nodes and by the equations representing the edges, 3-dimensional coordinate values are added to the generated Reeb graph. The added 3-dimensional coordinate values and the equation representing a contour represent geometric data to be included in the 3-dimensional shape data.

The rendering circuit 16 comprises a surface patch generating unit 25. The surface patch generating unit 25 specifies a 2-dimensional plane which is orthogonal to a users' view, and generates a surface patch according to 2-dimensional representation of the 3-dimensional object projected onto the 2-dimensional plane. Any known method can be adopted for the surface patch generation. The generated surface patch is embedded into an area surrounded by the outer shape of the 3-dimensional object in the 2-dimensional expression and a contour specified by the contour generating unit 23, as will be explained later. A shading unit 26 carries out shading processing on the generated surface according to both the viewpoint and the position of a light source. Any known method can be adopted for the shading processing. The 2-dimensional display data obtained after the shading processing are transferred to the display control circuit 17.

An encryption circuit 27 related to the present embodiment is incorporated into the server 11. The encryption circuit 27 generates encrypted data of the 3-dimensional object by altering the obtained 3-dimensional shape data by using a linear transformation, an affine transformation or any nonlinear transformation, as will be explained later. In addition to an affine transformation or a nonlinear transformation, a transformation employing a known text encryption algorithm such as RSA method may be carried out by the encryption circuit 27 by regarding the the 3-dimensional shape data as text data. The generated encrypted data are sent to the network 10 by a communication control circuit 28 such as a modem. What is characteristic here is that the encrypted data are transferred to the network 10 after encryption has been carried out on the 3-dimensional shape data necessary for 2-dimensional display data generation, not on the 2-dimensional display data to be generally used for image display.

Figure 3:
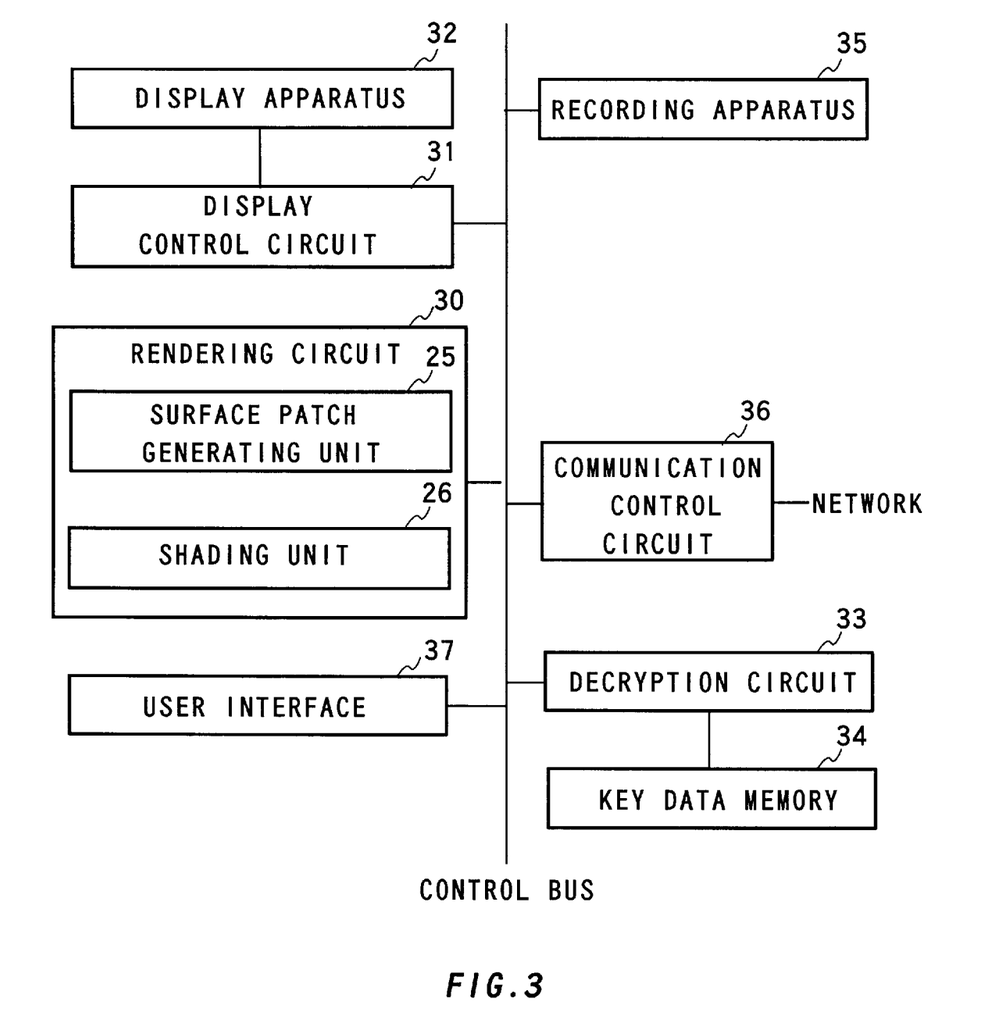
FIG. 3 is a block diagram showing a schematic configuration of a client.

As shown in FIG. 3, a surface patch generating unit 25 and a shading unit 26 are included in a rendering circuit 30 in each of the clients 12a~12c, similar to the rendering circuit 16 of the server 11. A display control circuit 31 receives 2-dimensional display data generated by the rendering circuit 30. An image represented by the 2-dimensional display data is displayed on a 2-dimensional display screen of a display apparatus 32 by the display control circuit 31.

The 3-dimensional shape data necessary for 2-dimensional shape data generation are provided from a decryption circuit 33. The decryption circuit 33 restores encrypted data having been obtained from the original 3-dimensional shape data based on key data specifying a degree of restoration, as will be described later. The key data used at this time are obtained from a key data memory 34. The key data have been received from the server 11 via the network 10 prior to restoration. In the case where the provided 3-dimensional shape data are stored in a recording apparatus 35, the rendering circuit 30 may receives the 3-dimensional shape data from the recording apparatus 35.

Figure 4:
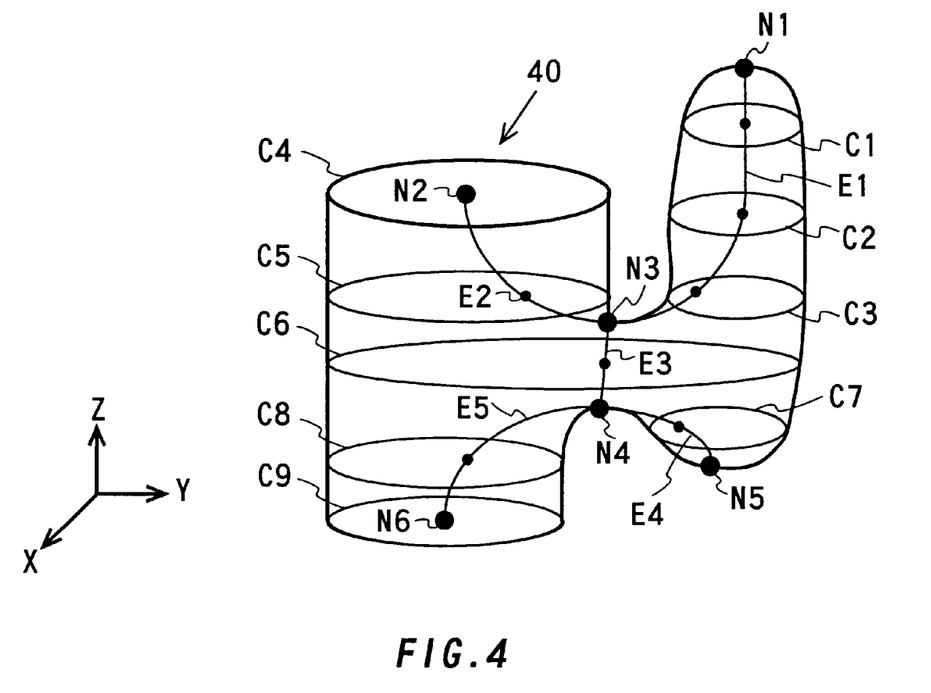
FIG. 4 is a diagram showing a Reeb graph and a contour extracted from a 3-dimensional object.
Figure 5:
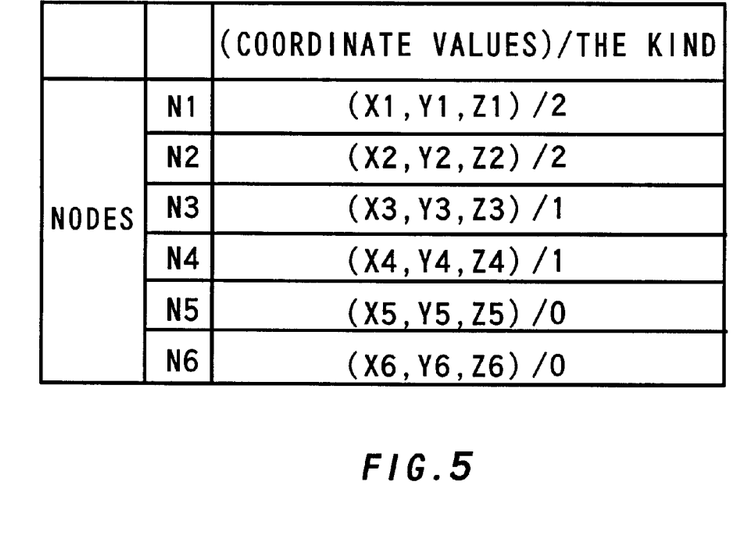
FIG. 5 is a table showing a data structure of nodes included in 3-dimensional shape data.

The encrypted data may be input from the recording apparatus 35 or from the network 10 via a communication control circuit 36 such as a modem. The recording apparatus 35 may include a magnetic disc device such as a hard disc drive (HDD) or a floppy disc drive (FDD), or an optical disc device such as a magneto-optic disc drive, a compact disc (CD) drive, or a DVD drive. A user interface 37 such as a keyboard and a mouse is used by an operator of the client 12a~12c for inputting an instruction or data. FIG. 4 shows a 3-dimensional object 40 placed in an xyz coordinate system. If a Morse function, for example, a height function, is set in the 3-dimensional object 40 along the z axis, six nodes N1~N6 are extracted. At the nodes N1~N3, an xy plane moved down along the z axis touches tangentially the surface of the 3-dimensional object 40. At the nodes N4~N6, an xy plane moved up along the z axis touches the 3-dimensional object 40. Therefore, at the nodes N1~N6, normal vectors extended from the surface of the 3-dimensional object 40 are parallel to the z axis. In a Reeb graph, the nodes N1 and N2 are classified as "peaks", nodes N3 and N4 as "saddle points", and nodes N5 and N6 as "pits". The xyz coordinate values and the kind of the nodes N1~N6 regularly extracted from the 3-dimensional object 40 in this manner are registered as 3-dimensional shape data shown in FIG. 5 by the node specifying unit 21. I this data structure, the kind of the singular points are specified as 2=a peak, 1=a saddle point, and 0=a pit.

In the Morse theory, when a singular point is degenerate, that is, when a singular point is actually a horizontal plane, the singular point cannot generally be specified. In such a case, degeneracy is avoided by introducing a virtual peak or a pit. As a result, the nodes N2 and N6 can be extracted from the 3-dimensional object 40.

Figure 6:
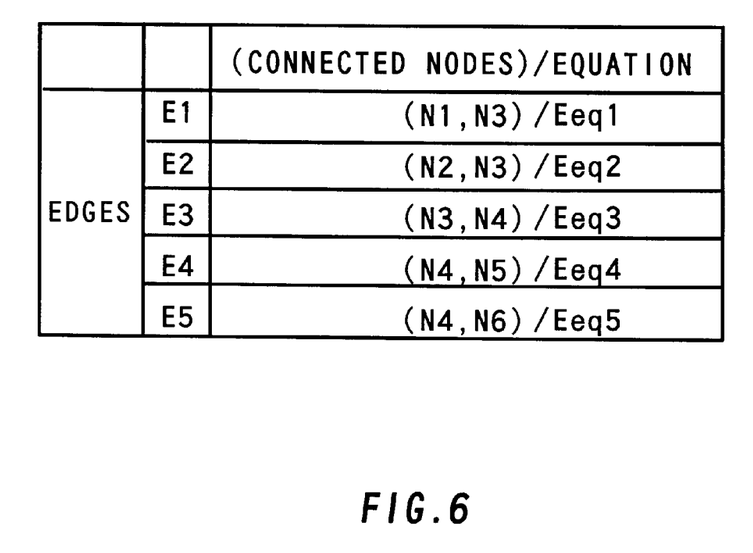
FIG. 6 is a table showing a data structure of edges included in the 3-dimensional shape data.
Figure 7:
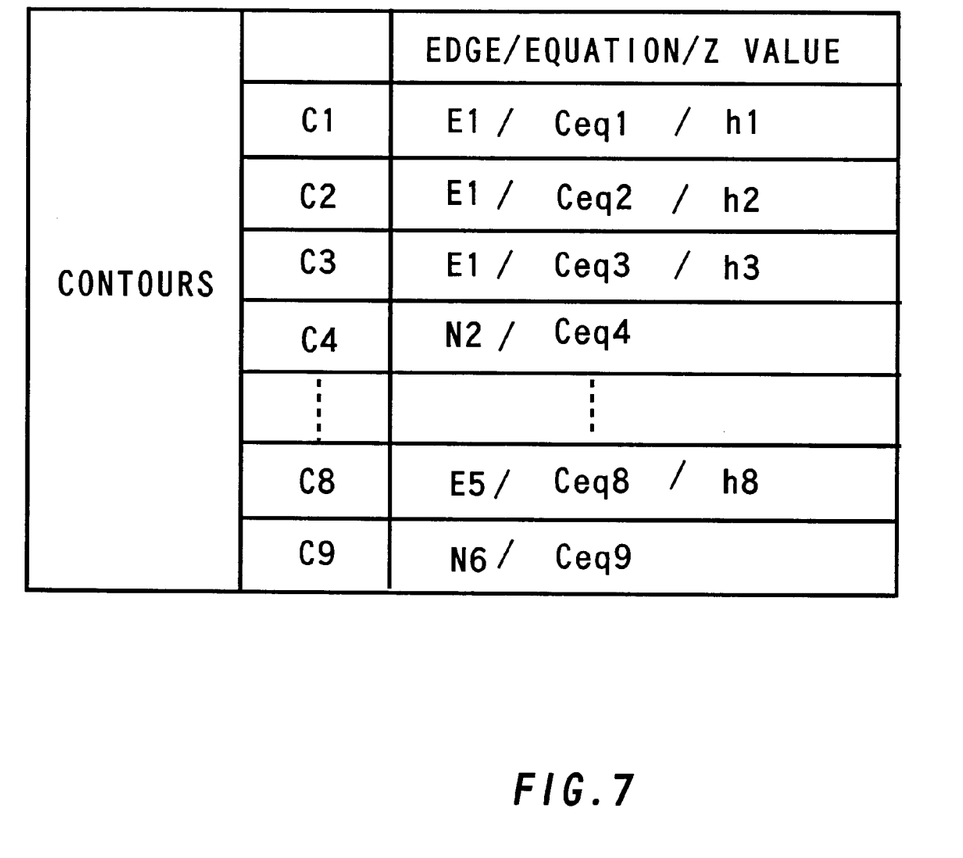
FIG. 7 is a table showing a data structure of contours included in the 3-dimensional shape data.

Referring to FIG. 4 again, according to the Reeb graph, edges E1~E5 each reaching from one node to another show a skeleton of the 3-dimensional object 40. The edges E1~E5 can be represented by parametric curves such as Bezier curves, B spline curves, and NURBS (Non Uniform Rational B Spline) curves in the 3-dimensional xyz coordinate system. Equations Eeq1~Eeq5 for the edges E1~E5 regularly extracted from the 3-dimensional object 40 are registered as 3-dimensional shape data shown in FIG. 6 by the edge specifying unit 22. As shown in FIG. 4, the outer shape of the 3-dimensional object 40 can be represented by contours C1~C9 in xy planes at selected points of the Reeb graph (including the nodes). The contours C1~C9 can be represented by parametric curves such as Bezier curves, B spline curves, and NURBS curves in the xy planes. The xy planes including the contours C1·C9 can be specified by the equations Eeq1~Eeq5 for the edges E1~E5 and their z coordinate values, for example. Equations Ceq1~Ceq9 for the contours C1~C9 regularly extracted from the 3-dimensional object 40 are registered as 3-dimensional shape data shown in FIG. 7 by the contour specifying unit 23. In this data structure, xy planes for the contours C4 and C9 at the nodes N2 and N6 are specified by the nodes N2 and N6.

Assume a case where the 3-dimensional shape data generated by the modeling circuit 15 of the server 11 are transferred to the clients 12a~12c. The encryption circuit 27 obtains the 3-dimensional shape data from the modeling circuit 15, and generates encrypted 3-dimensional shape data by altering the 3-dimensional shape data. Upon generation of the encrypted 3-dimensional shape data, either topological data or geometric data of the 3-dimensional shape data may be altered. When the topological data are altered, addition of a node or an edge between any nodes is possible. When the geometric data are altered, a nonlinear transformation or an affine transformation may be carried out on spatial position information represented by the coordinate values of the nodes and equations for the edges and the contours. The generated encrypted data are transferred to the network 10 via the communication control circuit 28, and distributed to the clients 12a~12c.

As shown in FIGS. 8A through 8E, for example, a base of a 3-dimensional object 42 is rotated in an xy plane by using an encryption key, which includes a program and key related data. According to the encryption key, an affine transformation R is carried out only on 3-dimensional shape data regarding a contour C12. Therefore, if the encrypted data are processed by the rendering circuit 16 of the server 11 or by the rendering circuit 30 of any of the clients 12a~12c, 2-dimensional expression of a distorted 3-dimensional object 43 different from the original 3-dimensional object 42 is displayed on a 2-dimensional display screen.

Figure 8A:
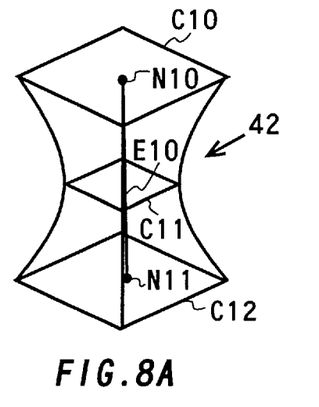
FIG. 8A is a diagram showing an example 3-dimensional image.
Figure 8B:
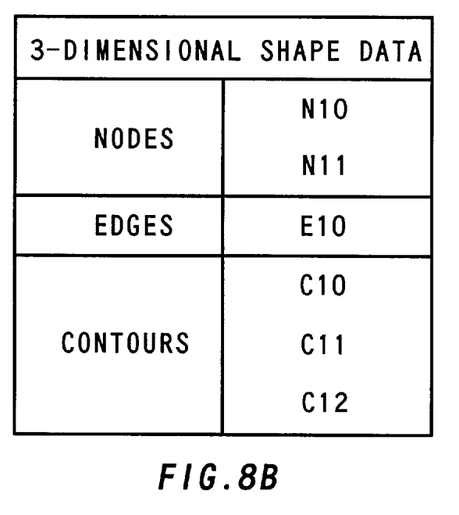
FIG. 8B is a table showing a list of nodes, edges and contours included in the 3-dimensional image shown in FIG. 8A.
Figure 8C:
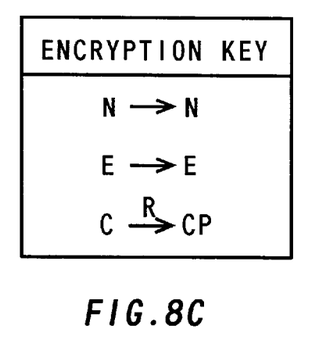
FIG. 8C is a table showing an encryption key for the nodes, edges and contours of the 3-dimensional image shown in FIG. 8A.
Figure 8D:
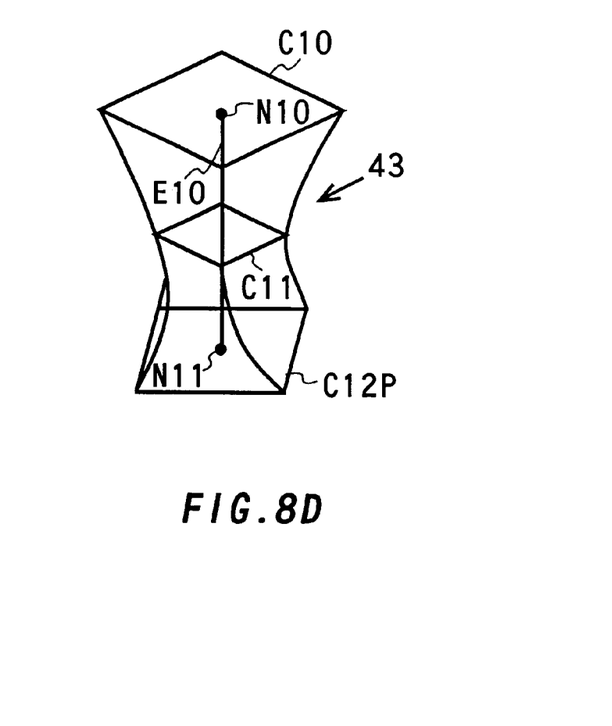
FIG. 8D is a diagram showing the 3-dimensional image of FIG. 8A after encryption.
Figure 8E:
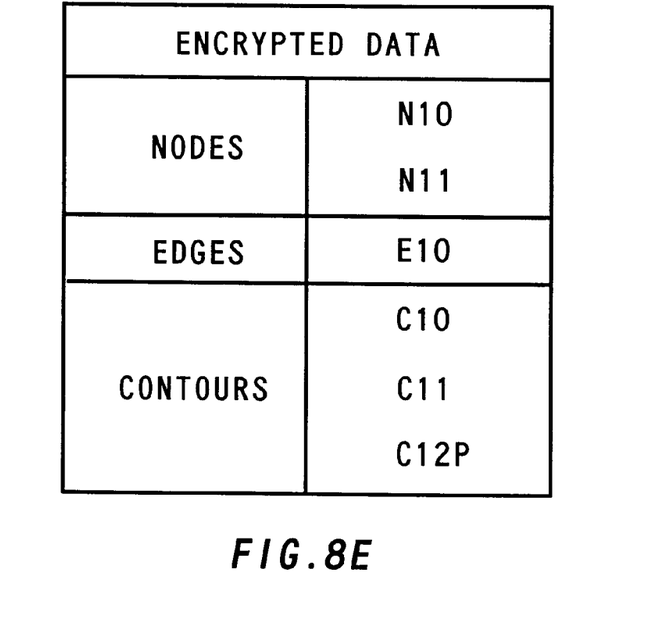
FIG. 8E is a table showing a list of nodes, edges and contours included in the encrypted 3-dimensional image shown in FIG. 8D.

A decryption key (program) to be paired with the encryption key is registered in the key data memories 34 of the clients 12a–12c. When the clients 12a~12c receive the encrypted data, the decryption circuits 33 restore the 3-dimensional shape data from the encrypted data by using the key data. When an inverse transformation R−1 of the affine transformation R is carried out by the decryption circuits 33, 3-dimensional shape data completely identical to the original 3-dimensional shape data are restored. As a result, the 2-dimensional expression of the 3-dimensional object 42 is displayed on the display apparatuses 32 of the clients 12a~12c.

Figure 9A:
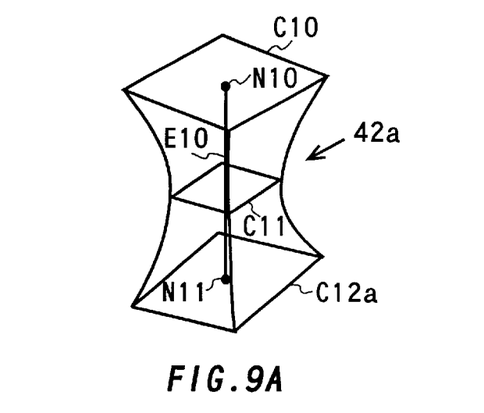
FIG. 9A is a diagram showing an example decrypted 3-dimensional image for a first end-user.
Figure 9B:
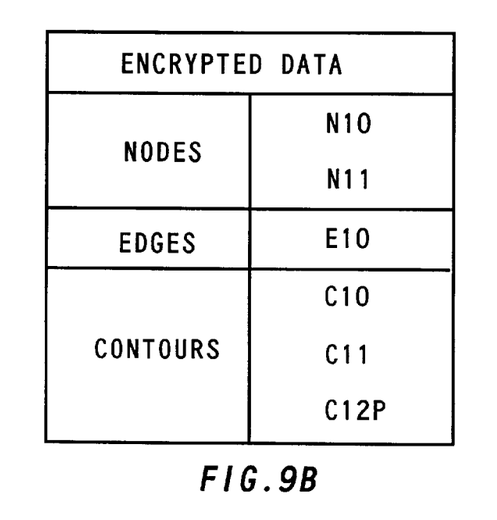
FIG. 9B is a table showing a list of nodes, edges and contours included in the encrypted 3-dimensional image shown in FIG. 8D.
Figure 9C:
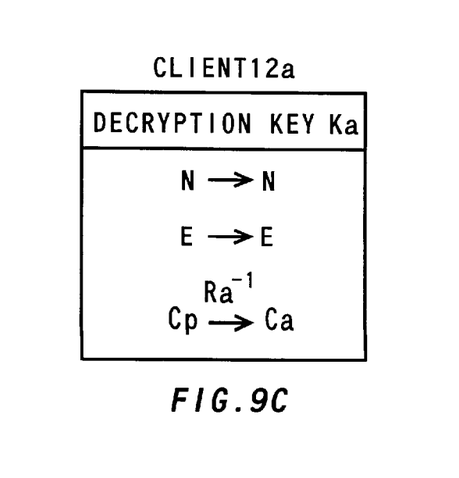
FIG. 9C is a table showing a decryption key for producing the 3-dimensional image shown in FIG. 9A.

In one case, as shown in FIGS. 9A through 9E, key data having a different restoration degree for each of the clients 12a~12c are stored in the key data memories 34. For example, as shown in FIG. 9C, the client 12a stores a decryption key Ka to restore the 3-dimensional shape data to an 80% restoration degree, and in FIG. 9E, the client 12b stores a decryption key Kb to restore the 3-dimensional shape data to a 50% restoration degree. In one embodiment, an inverse transformation Ra−1 carries out rotation operation at an angle which is 80% of the rotation angle of the inverse transformation R−1, while an inverse transformation Rb−1 performs rotation at a 50% rotation angle.

Figure 9D:
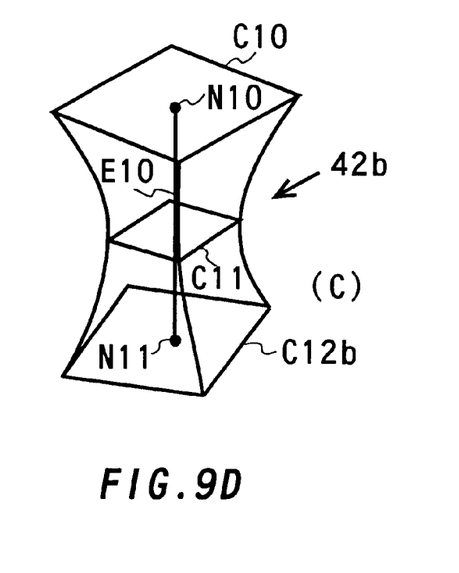
FIG. 9D is a diagram showing an example decrypted 3-dimensional image for a second end-user.
Figure 9E:
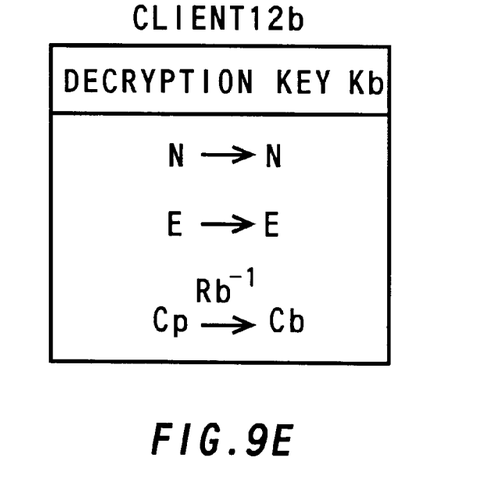
FIG. 9E is a table showing a decryption key for producing the 3-dimensional image shown in FIG. 9D.
Figure 10A:
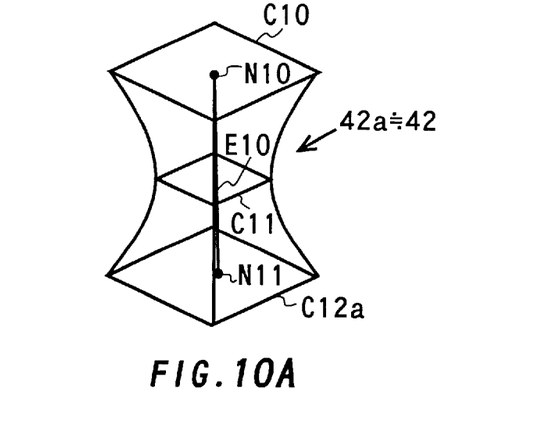
FIG. 10A is a diagram showing an example decrypted 3-dimensional image for a first end-user.
Figure 10B:
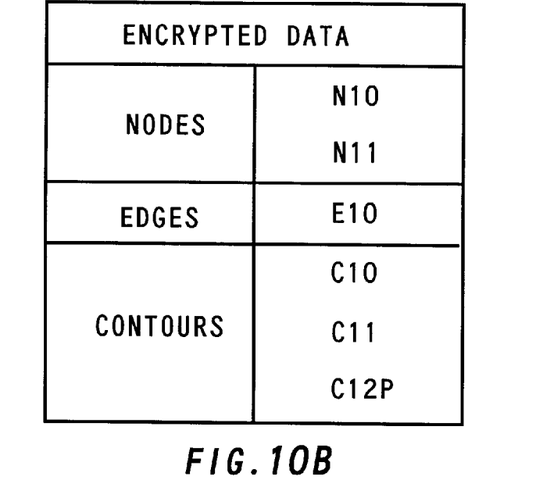
FIG. 10B is a table showing a list of nodes, edges and contours included in the encrypted 3-dimensional image shown in FIG. 8D.
Figure 10C:
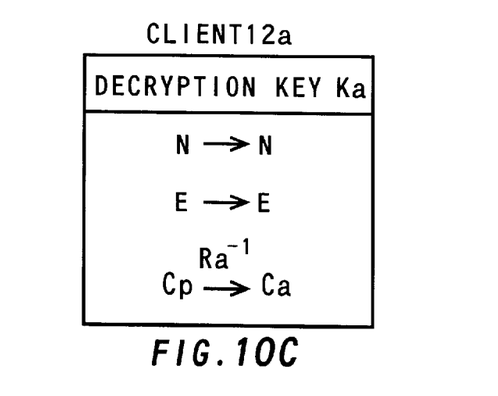
FIG. 10C is a table showing a decryption key for producing the 3-dimensional image shown in FIG. 10A.
Figure 10D:
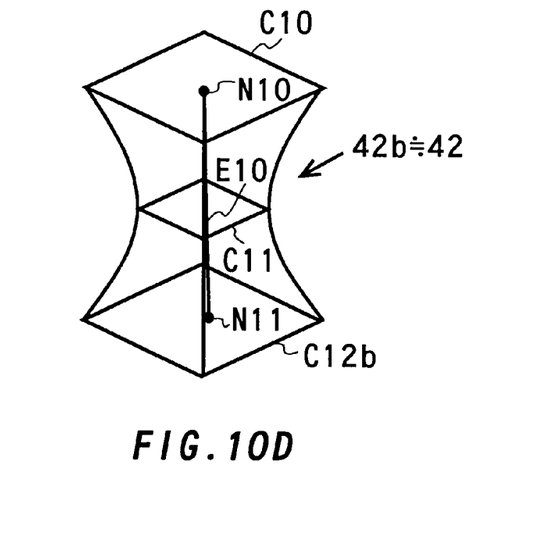
FIG. 10D is a diagram showing an example decrypted 3-dimensional image for a second end-user.
Figure 10E:
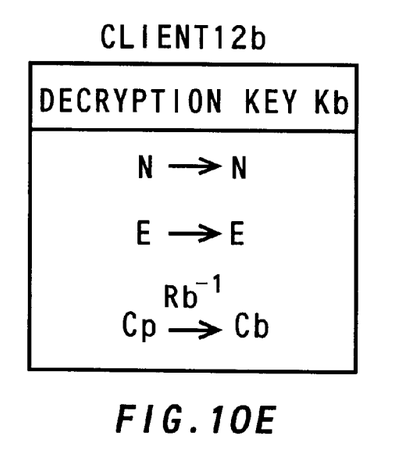
FIG. 10E is a table showing a decryption key for producing the 3-dimensional image shown in FIG. 10D.

The client 12a rotates by the inverse transformation Ra−1 a contour C12p of the 3-dimensional object 43 at an angle 80% of the rotation angle of the inverse transformation R−1. As shown in FIG. 9A, a distorted 3-dimensional object 42a which is different from the original object 42 is generated. Meanwhile, the client 12b rotates by the inverse transformation Rb−1 the contour C12p of the 3-dimensional object 43 at an angle 50% of the rotation angle of the inverse transformation R−1. As shown in FIG. 9D, a 3-dimensional object 42b which is more distorted than the object 42a generated by the client 12a is generated. As a result, the client 12a can display the 2-dimensional expression of the 3-dimensional object 42a in higher display quality on a 2-dimensional display screen than the client 12b.

When the restoration degree of 3-dimensional shape data has a range, an intentional variance in display quality of a 3-dimensional object represented by restored 3-dimensional shape data can be generated. As a result, display quality adjustment in accordance with a monetary charge can be carried out.

The procedure in which the decryption circuit 33 generates 3-dimensional shape data (decrypted data) wherein at least a portion of the alteration remains, not completely restored 3-dimensional shape data, is also helpful for addition of an identifier (ID) to the 3-dimensional shape data. If each of the clients 12a~12c has a different remaining alteration, tracing of which client has extracted the 3-dimensional shape data is easily known by extracting the alteration. Furthermore, if an identifier is added by the decryption circuit 33 of each of the clients 12a~12c, the server 11 only has to distribute common encrypted data to the plurality of clients 12a~12c, and a processing load on the server 11 is thus reduced substantially.

When the alteration of the 3-dimensional shape data is used as the identifier, such alteration is preferably imperceptible for human vision when the 2-dimensional expression of the 3-dimensional shape data is displayed based on the decrypted data on a 2-dimensional display screen. For example, as shown in FIGS. 10A through 10E, 3-dimensional shape data to be restored by the decryption keys Ka and Kb may have alterations left by the inverse transformations Ra−1 and Rb−1 which are only slightly different from the complete inversion R−1. Meanwhile, the 3-dimensional objects 42a and 42b to be displayed on a 2-dimensional screen have the same display quality as that of the original object 42. As a result, the identifier can be inserted into the 3-dimensional shape data without degrading the display quality of the 3-dimensional object.

In the above embodiment, the identifier has been added at the time of decrypting the encrypted data. However, the identifier may be added upon generation of the encrypted data. At the time of generating encrypted data by the encryption circuit 27 of the server 11, an alternation different for each destination, which may be a user, the user's terminal or any other targets, is added to the common 3-dimensional shape data. The 3-dimensional object represented by the encrypted data may be discerned by human vision as the same object as the object represented by the original 3-dimensional shape data. Upon distribution from the server 11, by adding further alteration to the encrypted data, the 3-dimensional object represented by the encrypted data having been altered may be different from the original 3-dimensional object.

In the above embodiment, the modeling circuit 15 and the rendering circuit 16 of the server 11 as well as the rendering circuit 30 of the clients 12a~12c are configured as hardware such as a computer chip or as on-board functional circuits. However, the functions to be performed by these circuits 15, 16, and 30 may be realized by central processing units (CPU's) according to software modules stored in the recording apparatuses 19 and 35. Also, each of the clients 12a~12c may have a modeling circuit similar to the modeling circuit 15 of the server 11.

As has been described above, according to the present invention, unauthorized use of a 3-dimensional object's shape represented by 3-dimensional shape data can be prevented by adding an alteration to the 3-dimensional shape data. Furthermore, a user of 3-dimensional shape data can be identified by inserting an identifier to the 3-dimensional shape data, making it easier to trace any piracy.

Although the present invention has been described by way of exemplary embodiments, it should be understood that many changes and substitutions may be made by those skilled in the art without departing from the spirit and the scope of the present invention which is defined only by the appended claims.

What is claimed is:

1. A 3-dimensional shape data encryption method comprising:

acquiring 3-dimensional shape data representing a shape of a 3-dimensional object; and generating encrypted data of the 3-dimensional object by altering nodes, edges and/or contours of the 3-dimensional shape data by performing a transformation of the 3-dimensional shape data in a manner that the shape of the 3-dimensional object is changed.

2. The method of claim 1, wherein the transformation comprises changing coordinate locations of the nodes, edges and/or contours of the 3-dimensional object based on a predetermined encryption key.

3. The method of claim 1, wherein the transformation is carried out on the 3-dimensional shape data to alter a node, edge and/or contour of the 3-dimensional object.

4. The method of claim 1, further comprising:

detecting an illegal copy of the encrypted data; and identifying a user, who distributed the illegal copy, by the transformation of the illegal copy.

5. A 3-dimensional shape data decryption method comprising:

acquiring encrypted data of a 3-dimensional object, the encrypted data being generated by altering nodes, edges and/or contours of a 3-dimensional shape data representing a shape of the 3-dimensional object in a manner that nodes, edges and/or contours of the 3-dimensional object are changed; and generating decrypted data whereto an identifier is added by altering the 3-dimensional shape data in a manner that the shape of the 3-dimensional object is changed, wherein the alteration occurs when the 3-dimensional shape data is decrypted.

6. The method of claim 5, wherein the identifier is added by maintaining a portion of the alteration applied in the encrypted data.

7. The method of claim 5, wherein the identifier is practically imperceptible.

8. The method of claim 7, wherein the identifier is practically imperceptible when the 3-dimensional object is displayed based on the decrypted data.

9. A 3-dimensional shape data decryption method comprising:

acquiring encrypted data of an original 3-dimensional object, wherein the encrypted data is generated by applying an alteration to 3-dimensional shape data representing the original 3-dimensional object such that a representation of the encrypted data remains recognizable as the original 3-dimensional object; and specifying a degree of restoration of the encrypted data.

10. The method of claim 9, further comprising restoring the 3-dimensional shape data based on the specified restoration degree.

11. The method of claim 9, wherein the restoration degree is less than fully restored.

12. The method of claim 11, further comprising recording users of different copies of the 3-dimensional shape data.

13. The method of claim 12, further comprising:

detecting an illegal copy of the decrypted data; and identifying a user, who distributed the illegal copy, based upon the restoration degree and recorded users of the copies of the 3-dimensional data.

14. The method of claim 9, wherein the restoration degree is associated with quality of service regarding distribution of the 3-dimensional shape data.

15. A 3-dimensional shape data decryption method for decrypting encrypted shape data representing an original 3-dimensional object, said method comprising:

acquiring the encrypted shape data of the original 3-dimensional object; and decrypting the encrypted shape data to produce decrypted data of the 3-dimensional object I such a way that:

the decrypted data is provided with an alteration, wherein the alteration is accomplished by altering at least one of the nodes, edges or contours, as compared with shape data of the original 3-dimensional object, such that a representation of the decrypted data is different from but remains recognizable as a representation of the decrypted data is different from but remains recognizable as a representation of the original 3-dimensional object; and the alteration is unique to the device or user performing the decryption.

16. The method of claim 14, wherein the encrypted shape data is encrypted by an alteration within the 3-dimensional shape data representing a change in the shape of the encrypted 3-dimensional object as compared to the original 3-dimensional object and wherein the alteration provided to the decrypted data results from a less than complete, but visually recognizable restoration of the original 3-dimensional object during decryption.

17. A computer program comprising computer executable instructions for 3-dimensional shape data decryption, which, when operating in a processor, cause the processor to perform the functions of:

acquiring encrypted shape data representing an original 3-dimensional object; and decrypting the encrypted shape data to produce decrypted data of the 3-dimensional object in such a way that:

the decrypted data is provided with an alteration within the 3-dimensional shape data representing a change in nodes, edges and/or contours of the decrypted 3-dimensional object as compared to the nodes, edges and/or contours of the original 3-dimensional object; and the alteration is unique to a key which defines an amount of change of the coordinates for the decrypted 3-dimensional object's nodes, edges and/ or contours when performing the decryption.

18. A 3-dimensional shape data decryption method comprising:

acquiring encrypted data of a 3-dimensional object, wherein the encrypted data is generated by altering coordinates for nodes, edges and/or contours of the 3-dimensional shape data representing a shape of the 3-dimensional object in a manner that the coordinates for nodes, edges and/or contours of the 3-dimensional object is changed; and generating decrypted data whereto an identifier is added by specifying a degree of restoration of the shape of the 3-dimensional object during the decryption of the encrypted data.

19. The method of claim 9, wherein the representation of the encrypted data comprises a visually altered but visually recognizable version of the original 3-dimensional object.

20. The method of claim 15, wherein the representation of the decrypted data comprises a visually altered but visually recognizable version of the original 3-dimensional object.

* * * * *